US007738907B2

(12) United States Patent  
Xiao et al.

(10) Patent No.: US 7,738,907 B2  
(45) Date of Patent: Jun. 15, 2010

(54) METHOD AND APPARATUS FOR UPLINK POWER CONTROL IN A FREQUENCY DIVISION MULTIPLE ACCESS COMMUNICATION SYSTEM

(75) Inventors: Weimin Xiao, Hoffman Estates, IL (US); Amitava Ghosh, Buffalo Grove, IL (US); Rapeepat Ratasuk, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 10 days.

(21) Appl. No.: 11/676,357

(22) Filed: Feb. 19, 2007

(65) Prior Publication Data

US 2007/0293260 A1 Dec. 20, 2007

Related U.S. Application Data

(60) Provisional application No. 60/815,171, filed on Jun. 20, 2006.

(51) Int. Cl.  
  *H04B 1/00* (2006.01)  
  *H04B 17/00* (2006.01)  
  *H04B 7/00* (2006.01)  
  *H04Q 11/12* (2006.01)

(52) U.S. Cl. .............. 455/522; 455/69; 455/127.1; 455/226.1

(58) Field of Classification Search ............ 455/524, 455/525, 562.1, 561, 560, 436, 67.11, 226.1, 455/450, 453, 451, 522, 69, 127.1; 370/335, 370/328  
See application file for complete search history.

(56) References Cited

U.S. PATENT DOCUMENTS

| | | | |
|---|---|---|---|
| 6,058,107 A | 5/2000 | Love et al. | |
| 6,445,917 B1 * | 9/2002 | Bark et al. | 455/423 |
| 6,628,956 B2 * | 9/2003 | Bark et al. | 455/522 |
| 6,963,753 B1 * | 11/2005 | Hamabe | 455/522 |
| 6,975,363 B1 * | 12/2005 | Baldwin et al. | 348/512 |
| 7,031,742 B2 * | 4/2006 | Chen et al. | 455/522 |
| 7,197,315 B1 * | 3/2007 | Stephens et al. | 455/450 |
| 7,215,974 B2 * | 5/2007 | Haim | 455/522 |
| 7,248,898 B2 * | 7/2007 | Doi et al. | 455/562.1 |
| 2006/0211391 A1 | 9/2006 | Nishikawa et al. | |
| 2006/0286995 A1 * | 12/2006 | Onggosanusi et al. | 455/522 |
| 2007/0225013 A1 * | 9/2007 | Pflum et al. | 455/452.2 |

OTHER PUBLICATIONS

3GPP TSG-RAN WG1#44, R1-060485, "Uplink Inter-cell Interference Mitigation using Load Indication", Denver, USA, Feb. 13-17, 2006, pp. 1/2-2/2.  
3GPP TSG-RAN WG1 #44 Meeting, R1-060418, Denver, USA, Feb. 13-17, 2006, pp. 1/5-5/5.

\* cited by examiner

*Primary Examiner*—Tilahun Gesesse  
(74) *Attorney, Agent, or Firm*—Steven A. May

(57) ABSTRACT

A communication system optimizes cell edge performance and spectral efficiency by determining an adaptive power control parameter based on system performance metrics measured by a serving Node B and further measured by, and reported to the serving Node B by, neighboring Node B's. The adaptive power control parameter is then used to determine an uplink transmit power of a user equipment (UE) served by the serving Node B. The uplink transmit power may be determined by the Node B and then conveyed to the UE, or the Node B may broadcast the adaptive power control parameter to the UE and the UE may self-determine the uplink transmit power. In addition, as a frequency reuse factor of one has been proposed for such communication systems, interference levels may be even further improved by employment of an intra-site interference cancellation scheme in the sectors serviced by the Node B.

28 Claims, 7 Drawing Sheets

200

300

METHOD AND APPARATUS FOR UPLINK POWER CONTROL IN A FREQUENCY DIVISION MULTIPLE ACCESS COMMUNICATION SYSTEM

CROSS REFERENCE TO RELATED APPLICATION

This application is related to U.S. patent application No. 60/759,700, filed Jan. 18, 2006, and entitled "Method and Apparatus for Uplink Resource Allocation in a Frequency Division Multiple Access Communication System," and claims priority from U.S. patent application No. 60/815,171, filed Jun. 20, 2006, and entitled "Method and Apparatus for Uplink Power Control in a Frequency Division Multiple Access Communication System."

FIELD OF THE INVENTION

The present invention relates generally to Single Carrier and Multi-Carrier Frequency Division Multiple Access (FDMA) communication systems, and, in particular, to uplink power control in Single Carrier and Multi-Carrier FDMA communication systems.

BACKGROUND OF THE INVENTION

Single Carrier and Multi-Carrier Frequency Division Multiple Access (FDMA) communication systems, such as IFDMA, DFT-SOFDMA, and OFDMA communication systems, have been proposed for use in 3GPP (Third Generation Partnership Project) and 3GPP2 Evolution communication systems for transmission of data over an air interface. In Single Carrier and Multi-Carrier FDMA communication systems, a frequency bandwidth is split into multiple contiguous frequency sub-bands, or sub-carriers, that are transmitted simultaneously. A user may then be assigned one or more of the frequency sub-bands for an exchange of user information, thereby permitting multiple users to transmit simultaneously on the different sub-carriers. These sub-carriers are orthogonal to each other, and thus intra-cell interference is reduced.

To maximize the spectral efficiency, a frequency reuse factor of one has been proposed for both a downlink and an uplink in Single Carrier and Multi-Carrier FDMA communication systems. With a frequency reuse factor of one, data and control channels in one sector/cell will likely experience interference from other sectors/cells. This is especially true for users equipment (UEs) at the edge of a cell or at bad coverage locations. Therefore, letting each users equipment (UE) in a sector or cell transmit at full power on the uplink results in very poor edge performance. On the other hand, implementation of a traditional power control scheme, wherein each UE in a sector or cell transmits at an uplink power that results in a same received power at a radio access network for each such UE, suffers from a low overall spectral efficiency due to a lack of UEs that can transmit at high data rates.

Therefore, a need exists for a resource allocation scheme that results in a better tradeoff between the cell-edge performance and the overall spectral efficiency.

Figure 1:
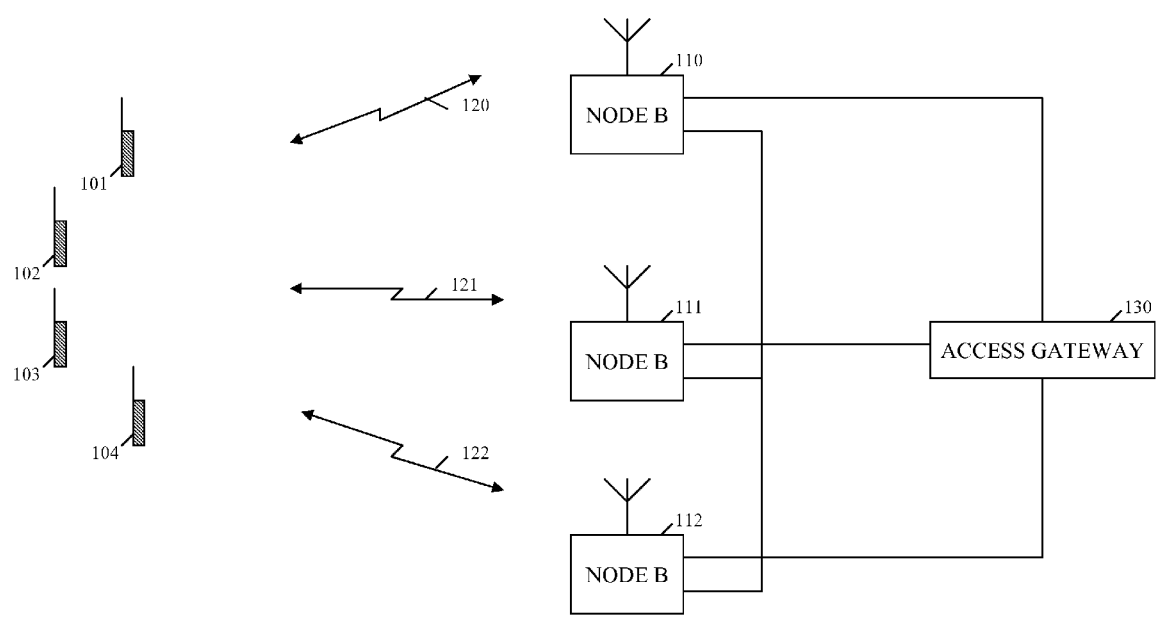
FIG. 1 is a block diagram of a wireless communication system in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a resource allocation scheme that results in a better tradeoff between the cell-edge performance and the overall spectral efficiency, a communication system allocates uplink transmit power to a user equipment (UE) based on an adaptive power control parameter that is, in turn, based on system performance metric measurements of a serving Node B and neighboring Node Bs. The adaptive power control parameter is then used to determine an uplink transmit power of a user equipment (UE) served by the serving Node B, The uplink transmit power may be determined by the Node B and then conveyed to the UE, or the Node B may broadcast the adaptive power control parameter to the UE and the UE may self-determine the uplink transmit power. In addition, as a frequency reuse factor of one has been proposed for such communication systems, interference levels may be even further improved by employment of an intra-site interference cancellation scheme in the sectors serviced by the Node B.

Generally, an embodiment of the present invention encompasses a method for uplink power control by a Node B in a Frequency Division Multiple Access communication system. The method includes measuring, by the Node B, a system performance metric, receiving, by the Node B from each Node B of one or more other Node Bs, a system performance metric measurement, and determining, by the Node B, an adaptive power control parameter based on the system performance metric measured by the Node B and the system performance metrics received from the other Node Bs of the one or more other Node Bs, wherein the adaptive power control parameter is used to determine an uplink transmit power level for one or more users equipment served by the Node B.

Another embodiment of the present invention encompasses a method for uplink power allocation by a Node B in a Frequency Division Multiple Access communication system. The method includes receiving, by the Node B from each Node B of one or more other Node Bs, a system performance metric measurement and determining, by the Node B, an uplink transmit power level for one or more users equipment served by the Node B based on the received system performance metric measurements.

Still another embodiment of the present invention encompasses a Node B capable of operating in a FDMA communication system, the Node B comprising a processor that is configured to measure a system performance metric, receive, from each Node B of one or more other Node Bs, a system performance metric measurement, and determine an adaptive power control parameter based on the system performance metric measured by the Node B and the system performance metric measurements received from the other Node Bs of the one or more other Node Bs, wherein the adaptive power control parameter is used to determine an uplink transmit power level for one or more users equipment served by the Node B.

Yet another embodiment of the present invention encompasses a Node B capable of operating in a Frequency Division Multiple Access communication system and comprising a processor that is configured to receive, from each Node B of one or more other Node Bs, a system performance metric measurement and to determine an uplink transmit power level for one or more users equipment served by the Node B based on the received system performance metric measurements.

Still another embodiment of the present invention encompasses a Node B capable of operating in a Frequency Division Multiple Access communication system and comprising a processor that is configured to determine a system performance metric measurement and to broadcast the system performance metric to other Node Bs via a backhaul.

Still another embodiment of the present invention encompasses a method for intra-site interference cancellation by a Node B serving at least a first sector and a second sector and further serving a plurality of users equipment (UEs) via the first and second sectors. The method includes determining a channel condition associated with each user equipment (UE) of the plurality of UEs, for each sector of the first and second sectors, ranking the UEs served by the sector, and for each sector of the first and second sectors, assigning a block of uplink resources to each UE serviced by the RAN based on the rankings of the UEs, wherein a UE served via a first sector of the plurality of sectors is assigned a same block of uplink resources as a UE serviced by a second sector of the plurality of sectors when both UEs are associated with similar channel conditions. The method further includes receiving a known signal from each UE of the plurality of UEs via each of the first and second sectors, receiving a signal comprising a data packet from each UE of the plurality of UEs via a serving sector, and decoding each signal comprising a data packet received from the plurality of UEs. The method further includes, when a signal comprising a data packet is unsuccessfully decoded, canceling a known signal received via a non-serving sector from a UE whose data packet was successfully decoded from the signal comprising the unsuccessfully decoded data packet to produce an intra-site interference canceled data packet signal, wherein the non-serving sector for the UE whose data packet was successfully decoded is the same sector as the sector via which the unsuccessfully decoded data packet was received, and decoding the intra-site interference canceled data packet signal.

Yet another embodiment of the present invention encompasses a Node B capable of operating in a Frequency Division Multiple Access communication system, wherein the Node B serves at least a first sector and a second sector and further serves a plurality of users equipment (UEs) via the first and second sectors, the Node B comprising a processor that is configured to cancel intra-site interference by determining a channel condition associated with each user equipment (UE) of the plurality of UEs, for each sector of the first and second sectors, ranking the UEs served by the sector, for each sector of the first and second sectors, assigning a block of uplink resources to each UE serviced by the RAN based on the rankings of the UEs, wherein a UE served via a first sector of the plurality of sectors is assigned a same block of uplink resources as a UE serviced by a second sector of the plurality of sectors when both UEs are associated with similar channel conditions, receiving a known signal from each UE of the plurality of UEs via each of the first and second sectors, receiving a signal comprising a data packet from each UE of the plurality of UEs via a serving sector, decoding each signal comprising a data packet received from the plurality of UEs, when a signal comprising a data packet is unsuccessfully decoded, canceling a known signal received via a non-serving sector from a UE whose data packet was successfully decoded from the signal comprising the unsuccessfully decoded data packet to produce an intra-site interference canceled data packet signal, wherein the non-serving sector for the UE whose data packet was successfully decoded is the same sector as the sector via which the unsuccessfully decoded data packet was received, and decoding the intra-site interference canceled data packet signal.

The present invention may be more fully described with reference to FIGS. 1-7B. FIG. 1 is a block diagram of a wireless communication system 100 in accordance with an embodiment of the present invention. Communication system 100 includes multiple Node Bs 110-112 (three shown) that each provides wireless communication services to UEs residing in a coverage area, such as a cell or a sector, of the Node B via a respective air interface 120-122. Each air interface 120-122 comprises a respective downlink and a respective uplink. Each of the downlinks and uplinks comprises multiple physical communication channels, including at least one signaling channel and at least one traffic channel. Each Node B of the multiple Node Bs 110-112 is in communication with the other Node Bs of the multiple Node Bs via one or more of a network access gateway 130 and an inter-Node B interface that may comprise one or more of a wireline link and a wireless link of all of the Node Bs and via which each Node B may broadcast to the other Node Bs. Access gateway 130 is a gateway via which a network may access each of the Node Bs, such as a Radio Network Controller (RNC), a mobile switching center (MSC), a Packet Data Service Node (PDSN), or a media gateway, and via which the Node Bs may communicate with each other.

Figure 2:
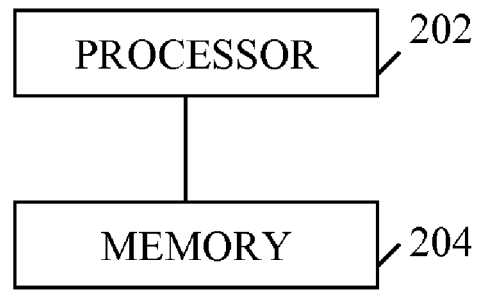
FIG. 2 is a block diagram of a Node B of FIG. 1 in accordance with an embodiment of the present invention.

FIG. 2 is a block diagram of a Node B 200, such as Node Bs 110-112, in accordance with an embodiment of the present invention. Node B 200 includes a processor 202, such as one or more microprocessors, microcontrollers, digital signal processors (DSPs), combinations thereof or such other devices known to those having ordinary skill in the art. The particular operations/functions of processor 202, and thus of Node B 200, are determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the corresponding processor. Processor 202 further implements a scheduler, such as a Proportional Fair Scheduler, based on instructions maintained in the at least one memory device 204 and that determines and allocates a transmit power for each UE serviced by the Node B.

Figure 3:
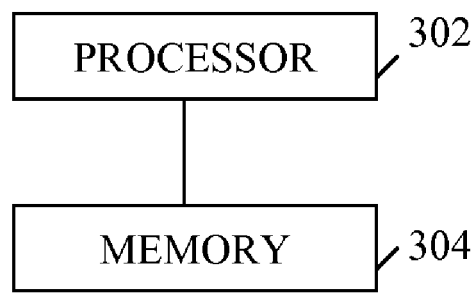
FIG. 3 is a block diagram of a user equipment of FIG. 1 in accordance with an embodiment of the present invention.

Communication system 100 further includes multiple wireless users equipment (UEs) 101-104 (four shown), such as but not limited to a cellular telephone, a radio telephone, a personal digital assistant (PDA) with radio frequency (RF) capabilities, or a wireless modem that provides RF access to digital terminal equipment (DTE) such as a laptop computer. For purposes of illustrating the principles of the present invention, it is assumed that each UE 101-104 is served by Node B 111. FIG. 3 is a block diagram of a user equipment (UE) 300, such as UEs 101-104, in accordance with an embodiment of the present invention. UE 300 includes a processor 302, such as one or more microprocessors, microcontrollers, digital signal processors (DSPs), combinations thereof or such other devices known to those having ordinary skill in the art. The particular operations/functions of processor 302, and respectively thus of UE 300, is determined by an execution of software instructions and routines that are stored in a respective at least one memory device 304 associated with the processor, such as random access memory (RAM), dynamic random access memory (DRAM), and/or read only memory (ROM) or equivalents thereof, that store data and programs that may be executed by the corresponding processor.

The embodiments of the present invention preferably are implemented within Node Bs 110-112 and UEs 101-104. More particularly, the functionality described herein as being performed by each of Node Bs 110-112 is implemented with or in software programs and instructions stored in the at least one memory device 204 of the Node B and executed by an associated processor 202 of the Node B, and the functionality described herein as being performed by each of UEs 101-104 is implemented with or in software programs and instructions stored in the at least one memory device 304 of the UE and executed by an associated processor 302 of the UE. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 101-104 and Node Bs 110-112. Based on the present disclosure, one skilled in the art will be readily capable of producing and implementing such software and/or hardware without undo experimentation.

Communication system 100 comprises a wideband packet data communication system that employs a Single Carrier or a Multi-Carrier Frequency Division Multiple Access (FDMA) air interface technology, wherein a frequency bandwidth is split into multiple frequency sub-bands, or subcarriers, that comprise the physical layer channels over which traffic and signaling channels are transmitted simultaneously. A user may then be assigned one or more of the frequency sub-bands for an exchange of user information, thereby permitting multiple users to transmit simultaneously on the different sub-carriers. Further, communication system 100 preferably operates in accordance with the 3GPP (Third Generation Partnership Project) E-UTRA (Evolutionary UMTS Terrestrial Radio Access) standards, which standards specify wireless telecommunications system operating protocols, including radio system parameters and call processing procedures. However, those who are of ordinary skill in the art realize that communication system 100 may operate in accordance with any wireless telecommunication system employing a frequency division multiplexing scheme or a time and frequency division multiplexing scheme, wherein a sub-band comprises a frequency sub-band or a time and frequency sub-band, such as a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, 802.16, or 802.21 standards, or any of multiple proposed ultrawideband (UWB) communication systems.

In order to optimize system performance at the edges of a coverage area, communication system 100 provides uplink fractional power control and minimum bandwidth allocation. That is, at any given time and for a given coverage area associated with a Node B of the multiple Node Bs 110-112, such as Node B 111, communication system 100 allocates an uplink transmit power to each UE, such as UEs 101-104, served by the Node B and which power is designed to provide acceptable received power at the Node B while minimizing interference among all such UEs and UEs in adjacent coverage areas. In addition, for any given Transmission Time Interval (TTI), the Node B, that is, Node B 111, determines and allocates a minimum amount of bandwidth to each UE 101-104 engaged in a communication session that is sufficient to provide acceptable service to the UE based on measured system performance metrics.

Figure 4:
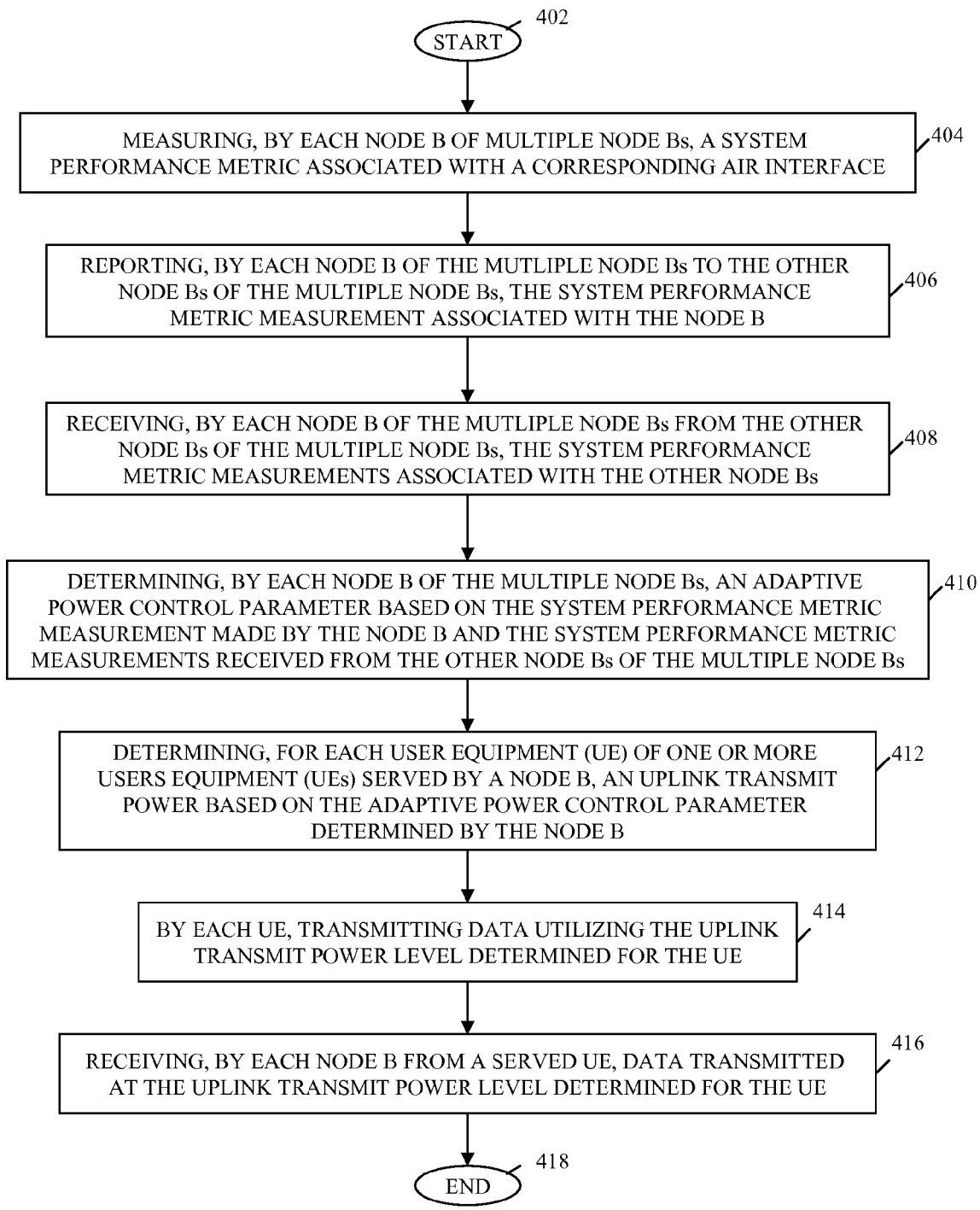
FIG. 4 is a logic flow diagram illustrating a method of uplink power control executed by the communication system of FIG. 1 in accordance with an embodiment of the present invention.

Referring now to FIG. 4, a logic flow diagram 400 is provided that illustrates a method of uplink power control executed by communication system 100 in accordance with an embodiment of the present invention. Logic flow diagram 400 begins (402) when each Node B of the multiple Node Bs 110-112 measures (404) one or more system performance metrics associated with a corresponding air interface 120-122. For example, the Node B may measure one or more of a interference over thermal-noise ratio (IoT), a load in the coverage area, such as a sector or a cell, serviced by the Node B, a fairness or a cell-edge performance metric, such as a fairness criterion or a cell edge user throughput, and a throughput associated with the Node B, such as a cell or a sector throughput associated with the Node B. For example, the load in a coverage area may comprise one or more UEs in a coverage area, a number of active UEs in a coverage area, a number of channels that are available for assignment, or that are currently assigned, in a coverage area, a level of currently available, or currently utilized, transmit power at a Node B, or a total amount of transmit power currently assigned to UEs served by a Node B via a coverage area. Fairness and cell-edge performance metrics are well-known in the art and will not be described in detail herein, except to note that fairness is typically implemented by a scheduler, such as a Proportional Fair Scheduler, residing in a Node B, such as Node Bs 110-112, and relates to an opportunity to transmit that is given to UEs served by the Node B and experiencing bad channel conditions. Similarly, cell-edge performance relates to an opportunity to transmit that is given to UEs residing at the edge of a cell and the quality of their signal as received at the serving Node B. However, one of ordinary skill in the art realizes that there are many ways for a Node B to determine system performance metrics associated with a UE serviced by the Node B, and any such method may be used herein without departing from the spirit and scope of the present invention.

As is known in the art, UEs served by a Node B report channel condition measurements to the Node B. In another embodiment of the present invention, the system performance metrics measured by, or measured by and reported by, each of Node Bs 110-112 may instead, or in addition, include these reported channel condition measurements. For example, each UE served by a Node B, such as UEs 101-104 with respect to Node B 111, may measure a downlink channel condition, preferably measuring Channel Quality Information (CQI) as is known in the art, associated with each sub-band of a bandwidth employed by communication system 100 to produce a plurality of downlink channel measurements. One of ordinary skill in the art realizes that many parameters may be measured in determining channel quality and that any such parameter may be used herein without departing from the spirit and scope of the present invention. As is known in the art, each UE 101-104 measures channel conditions for each and every sub-band during a measuring period, such as a Transmission Time Interval (TTI) (also known as a sub-frame) or a radio frame transmission period. Each UE of the multiple UEs 101-104 then reports the measured channel conditions for all of the sub-bands to that serving Node B, that is, Node B 111, preferably in a Channel Quality Information (CQI) message. Each UE of the multiple UEs 101-104 may further store the UE's downlink channel condition measurements.

Each Node B of the multiple Node Bs 110-112 then reports (406), preferably broadcasts, its system performance metric measurements to the other Node Bs of the multiple Node Bs via a network backhaul, preferably via an inter-Node B interface or via access gateway 130. Based on the system performance metric measurements received (408) from the other Node Bs of the multiple Node Bs 110-112, and further based on the system performance metric measured by the Node B with respect to its own air interface, each Node B 110-112 then determines (410) an adaptive power control parameter that is used to determine (412) an uplink transmit power level for each of the one or more UEs served by the Node B, such as each of UEs 101-104 with respect to Node B 111. Each UE then transmits (414) data to the UE's serving Node B, and the serving Node B receives (416) the data from the UE, utilizing the UE's determined uplink transmit power level and via the uplink of the corresponding air interface until a next uplink power level update period. Logic flow 400 then ends (418).

Figure 5:
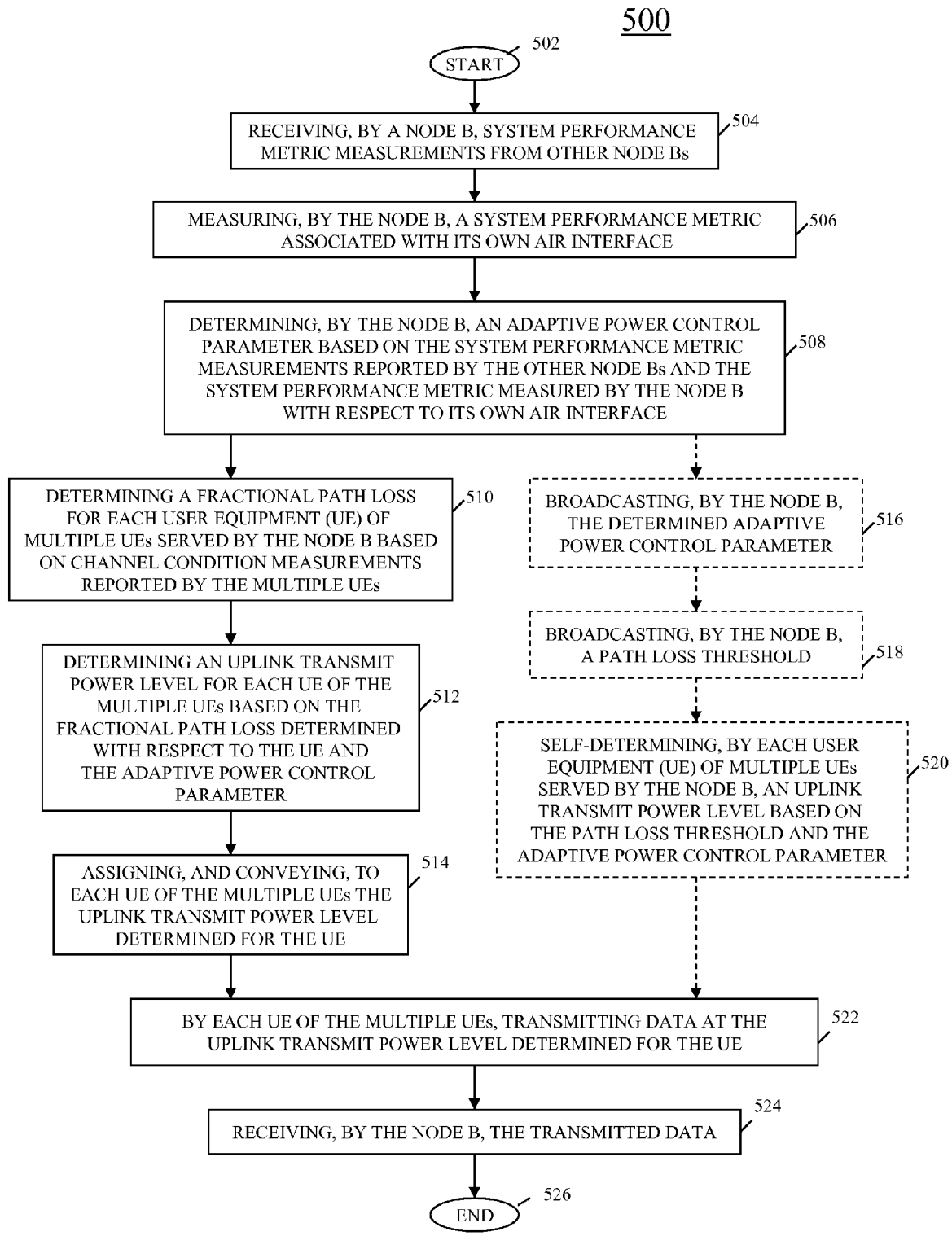
FIG. 5 is a logic flow diagram illustrating a method of determining, by a Node B of FIG. 1, an uplink transmit power level for each of one or more users equipment served by the Node B in accordance with an embodiment of the present invention.

FIG. 5 is a logic flow diagram 500 of a method executed by a Node B 110-112 in determining an uplink transmit power level for each of the one or more UEs served by the Node B in accordance with an embodiment of the present invention. Logic flow diagram 500 begins (502) when the Node B, such as Node B 111, receives (504) system performance metric measurements from the other Node Bs, that is, Node Bs 110, 112, of the multiple Node Bs 110-112 and further measures (506) a system performance metric associated with its own air interface, that is, air interface 121. Although the determination of an uplink transmit power is described herein with respect to Node B 111, one of ordinary skill in the art realizes that the method applies equally to any of the multiple Node B's 110-112 and Node B 111 is referenced merely for the purpose of illustrating the principles of the present invention.

Based on the system performance metric measurements received from the other Node Bs 110, 112 and further based on the system performance metric measurement determined with respect to its own air interface 121, Node B 111 determines (508) an adaptive power control parameter, where the adaptive power control parameter is a function of the system performance metric measurements reported by the other Node Bs and system performance metric measured by the Node B and associated with the Node B's own air interface. For example, when the system performance metrics comprise IoT, cell load, a fairness/cell-edge performance metric, and a sector throughput, then the adaptive power control parameter may be determined based on the following equation, which equation is maintained in the at least one memory device 204 of the Node B and/or the at least one memory device 304 of each of UEs 101-104, $$\text{Adaptive Power Control Parameter} = f(I_{Node\,B\,110}, LOAD_{Node\,B\,110}, \text{Fairness/CEP}_{Node\,B\,110}, ST_{Node\,B\,110}, I_{Node\,B\,111}, LOAD_{Node\,B\,111}, \text{Fairness/CEP}_{Node\,B\,111}, ST_{Node\,B\,111}, I_{Node\,B\,112}, LOAD_{Node\,B\,112}, \text{Fairness/CEP}_{Node\,B\,112}, ST_{Node\,B\,112}, \ldots)$$

where '$I_{Node\,B\,110}$' represents the interference measured at Node B 110, '$LOAD_{Node\,B\,110}$' represents the load measured at Node B 110, 'Fairness/CEP$_{Node\,B\,110}$' represents a fairness or cell-edge performance metric determined by Node B 110, '$ST_{Node\,B\,110}$' represents the sector throughput measured by Node B 110, '$I_{Node\,B\,111}$' represents the interference measured at Node B 111, and so on. In various embodiments of the present invention, the adaptive power control parameter may be a function of any one or more of these parameters determined at each Node B, so long as the same one or more parameters for each Node B are used to determine the adaptive power control parameter.

For example, the adaptive power control parameter may be represented by the symbol α and may be determined based on the following equation, which equation is maintained in the at least one memory device 204 of the Node B and/or the at least one memory device 304 of each of UEs 101-104, $$\alpha(n) = \alpha(n-1) - sgn\{I_t - \Sigma c_{cell} I_{cell}\} \cdot \Delta.$$

'Δ' represents a power adjustment step size, preferably in dB and comprising a small step, such as 0.1 dB or 0.01 dB. $I_t$ represents a target system performance metric level, such as a target interference level and preferably an average system performance metric level, for the coverage area served by Node B 111. $I_{cell}$ represents the system performance metric, for example, interference level, measured by and reported by each Node B 110-112. $c_{cell}$ represents a weighting factor that is applied to the system performance metric measurements, for example, the interference level, reported by each Node B. $c_{cell}$ is used to weight the system performance metric measurements of a Node B based on an anticipated impact of a channel condition, such as interference, generated in the cell served by the Node B on channel conditions in the coverage area of Node B 111. For example, $c_{cell}$ may correspond to a distance of a Node B from serving Node B 111. Σ corresponds to a summing of $c_{cell} I_{cell}$ over all of the multiple Node Bs 110-112, and α(n−1) represents a determination of α from a preceding uplink power level update period. When α is first determined, α(n−1) may be a predetermined value. 'Sgn' corresponds to a sign function, that is, when the quantity { } is less than zero (<0), then sgn{ }·Δ=−Δ, and when the quantity { } is greater than zero (>0), then sgn{ }·Δ=+Δ.

Further, based on channel condition measurements reported by UEs served by Node B 111, that is, UEs 101-104, the Node B determines (510) a fractional path loss for each such UE. That is, Node B 111 determines a path loss (L) for each of UEs 101-104 and ranks the UEs based on their determined path losses. Typically, path loss L is determined as a ratio of transmit power to received power. For example, Node B 111 may determine a path loss for a UE by averaging path losses associated with each of the sub-bands measured and reported by the UE. However, other algorithms will occur to one of ordinary skill in the art for determining a path loss to be used in ranking a UE, such as using a best path loss or a worst path loss reported by the UE, which algorithms may be used herein without departing from the spirit and scope of the present invention. Based on the rankings, Node B 111 then determines a path loss of a UE that is ranked at a predetermined percentile in the rankings to produce a path loss threshold, that is, a path loss of a UE whose path loss is at the $x^{th}$-percentile level ($L_{x\text{-}ile}$). Node B 111 then compares the actual path loss of the UE (L) to the path loss threshold to determine a fractional path loss for the UE, for example, $L_{x\text{-}ile}/L$.

Node B 111 then determines (512) an uplink transmit power level for each UE 101-104 based on the fractional path loss determined with respect to the UE and the adaptive power control parameter that is determined based on system performance metric measurements associated with each of Node Bs 110-112. Node B 111 assigns (514), and conveys to each UE 101-104, the uplink transmit power level determined for the UE. Each UE 101-104 then transmits (522) data to Node B 111 at the uplink transmit power level determined for the UE. Node B 111 receives (524) the transmitted data from UEs 101-104 and logic flow 500 then ends (526). That is, for each UE 101-104 served by Node B 111, the Node B determines an uplink transmit power level, $P_t$, for the UE based on the UE's maximum transmit power level for transmissions on uplink 114, $P_{max}$, a fractional power control parameter, $F_{PC}$, associated with the UE, and the adaptive power control parameter, represented in the following equation by $\alpha$. The fractional power control parameter, $F_{PC}$, corresponds to a fraction, or portion, of the UE's maximum transmit power level that the UE is assigned for transmissions on uplink 114 and is based on the fractional path loss associated with the UE. More particularly, Node B 111 determines a uplink transmit power level, $P_t$, for each UE 101-104, or each UE 101-104 self-determines an uplink transmit power level $P_t$, based on the following equation, which equation is maintained in the at least one memory device 204 of the Node B and/or the at least one memory device 304 of each of UEs 101-104, $$P_t = P_{max} \times F_{PC}, \text{ where } F_{PC} = \min\{1, \max[R_{min}, (L_{x\text{-}ile}/L)^\alpha]\}.$$

$R_{min}$ is a minimum power reduction ratio, that is, a ratio of a minimum uplink transmit power level of a UE in communication system 100 to $P_{max}$. A value corresponding to $R_{min}$ is up to a designer of communication system 100 and is designed to prevent UEs experiencing good path loss, that is, a minimal path loss, from being required to transmit at too low a power level. For example, if it is desired that the minimum uplink transmit power of a UE not be less than one-tenth (1/10) of $P_{max}$, then $R_{min}$=0.1. Again, the ratio $L_{x\text{-}ile}/L$ corresponds to a fractional path loss experienced by a UE, that is, the ratio $L_{x\text{-}ile}/L$ is a comparison of the actual path loss experienced by the UE (L) to a path loss threshold, preferably the path loss of a UE at the $x^{th}$ percentile ($L_{x\text{-}ile}$) of all UEs serviced by Node B 111, or an 'x-percentile path loss.' 'L' is determined based on a downlink channel quality measured by the UE and/or an uplink channel quality measured by Node B 111. Preferably, L includes path loss resulting from shadowing and slow fading but does not include path loss resulting from fast fading. $L_{x\text{-}ile}$ is a path loss of a UE at the $x^{th}$ percentile of all UEs serviced by Node B 111. For example, if 'x-ile'=5, that is, the $5^{th}$ percentile (5%-ile), then when all UEs serviced by Node B 111 are ranked based on path loss, $L_{x\text{-}ile}$ is a path loss of a UE at the $5^{th}$ percentile (from the bottom) of all of the ranked UEs. A result is that all UEs whose path loss L is greater than $L_{x\text{-}ile}$ (the bottom 5% when 'x-ile'=5) may transmit at $P_{max}$, while UEs whose path loss L is less than $L_{x\text{-}ile}$ may each transmit at a power level that is based on the comparison of their path loss L to the path loss threshold, that is, $L_{x\text{-}ile}$.

Node B 111 may use '$\alpha$' to determine $P_t$. However, in another embodiment of the present invention, after performing step 508, Node B 111 may broadcast (516) the adaptive power control parameter, that is, '$\alpha$', to the UEs 101-104 serviced by the Node B. Node B 111 further may determine a path loss threshold, that is, a path loss of a UE whose path loss is at the $x^{th}$-percentage level ($L_{x\text{-}ile}$), and inform (518) each UE 101-104 serviced by the Node B of the path loss threshold by broadcasting the path loss threshold to the UEs. In response to receiving $L_{x\text{-}ile}$ and $\alpha$ each UE 101-104 may store the parameters in the at least one memory device 304 of the UE and then self-determine (520) the fractional path loss and an uplink transmit power, $P_t$, based on downlink channel conditions measured by the UE and the stored path loss threshold $L_{x\text{-}ile}$ and $\alpha$. Each UE 101-104 then transmits (522) data to Node B 111 at the uplink transmit power level determined for the UE. Node B 111 receives (524) the transmitted data from UEs 101-104 and logic flow 500 then ends (526). Typically, 1>$\alpha$>0. When $\alpha$=0, then all UEs serviced by Node B 111 may transmit at full power ($P_t$=$P_{max}$) and UEs in the coverage area of Node B 111 are likely to experience high interference levels from the other UEs in the coverage area and poor edge performance, for example, due to the high uplink transmit power levels of UEs closer to Node B 111. When $\alpha$=1, then all UEs serviced by Node B 111 may transmit at an uplink power level that results in the same received power at Node B 111, resulting in poor spectral efficiency. By adaptively adjusting $\alpha$, communication system 100 is able to balance spectral efficiency with cell-edge performance, thereby providing an optimized combination of the two.

That is, by providing for a determination of an adaptive power control parameter based on system performance metric measurements associated with a serving Node B and further associated with, and reported to the serving Node B by, neighboring Node B's, which adaptive power control parameter is used to determine an uplink transmit power of a UE served by the serving Node B, communication system 100 provides edge users in a Single Carrier or a Multi-Carrier Frequency Division Multiple Access (FDMA) communication system, such as 3GPP or a 3GPP2 Evolution communication systems such as an E-UTRA communication system, with improved performance and a better chance to transmit while enhancing overall spectral efficiency. However, as a frequency reuse factor of one has been proposed for such communication systems, interference levels may be even further improved by providing for intra-site interference cancellation in the sectors serviced by a Node B.

Figure 6:
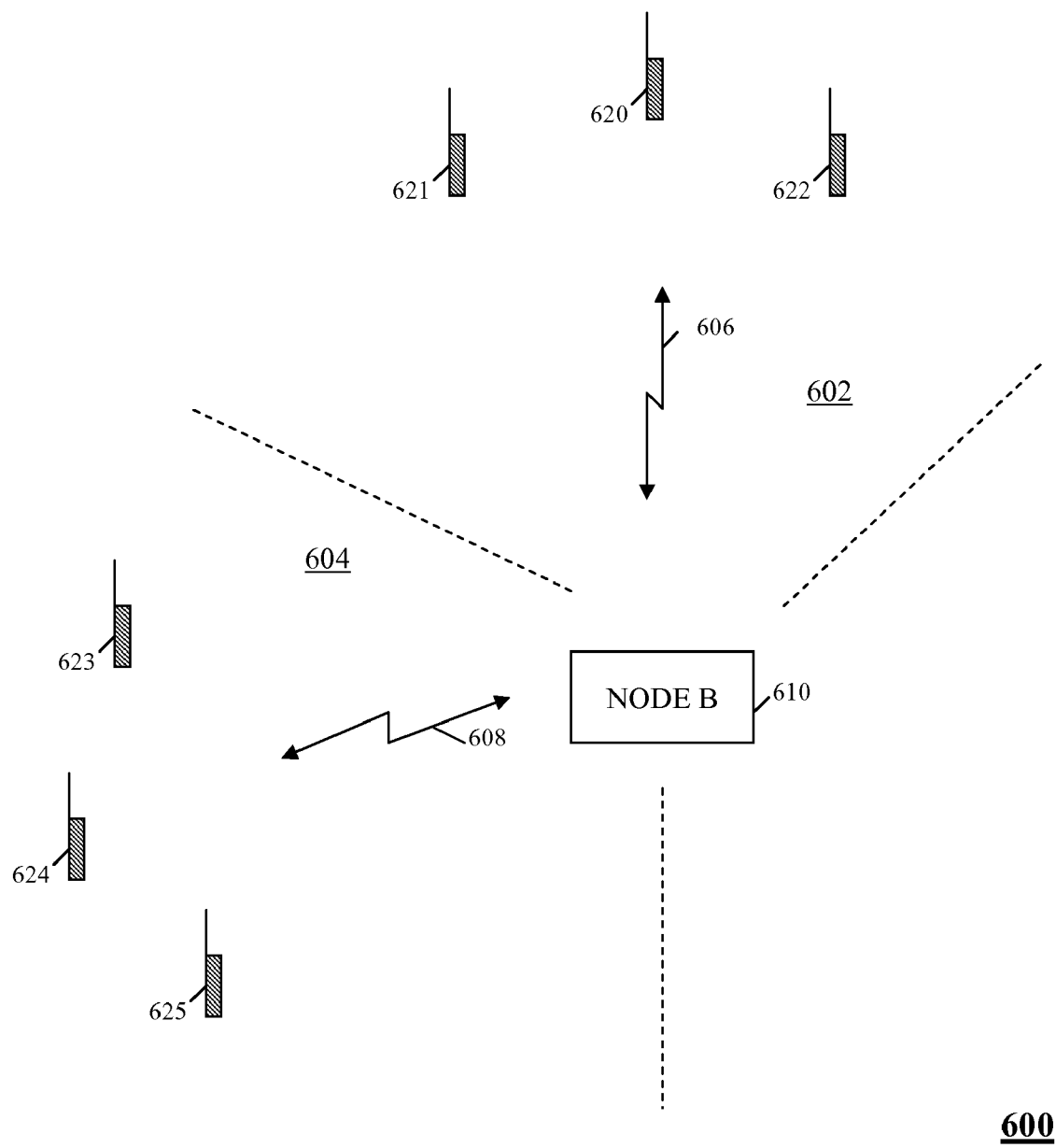
FIG. 6 is a block diagram of a communication system in accordance with another embodiment of the present invention.

Referring now to FIG. 6, a block diagram is provided of a communication system 600 in accordance with another embodiment of the present invention. Communication system 600 comprises a cell site that is divided into multiple sectors, including a first sector 602 and a second sector 604 (two shown). The sectors are each provided wireless communication services by a same Node B 610. Communication system 600 further includes multiple UEs 620-625 (six shown), wherein a first group 620-622 of the multiple UEs 620-625 reside in the first sector 602 of the multiple sectors 602, 604 and a second group 623-625 of the multiple UEs 620-625 reside in the second sector 604 of the multiple sectors 602, 604. Node B 610 provides wireless communication services to sectors 602 and 604 via air interfaces 606 and 608, respectively, wherein each air interface 606, 608 comprises an uplink (not shown) and a downlink (not shown).

Similar to communication system 100, communication system 500 comprises a wideband packet data communication system that employs a Single Carrier or a Multi-Carrier Frequency Division Multiple Access (FDMA) air interface technology, wherein a frequency bandwidth is split into multiple frequency sub-bands, or subcarriers, that comprise the physical layer channels over which traffic and signaling channels are transmitted simultaneously. A user may then be assigned one or more of the frequency sub-bands for an exchange of user information, thereby permitting multiple users to transmit simultaneously on the different sub-carriers. Further, communication system 500 preferably operates in accordance with the 3GPP (Third Generation Partnership Project) E-UTRA (Evolutionary UMTS Terrestrial Radio Access) standards, which standards specify wireless telecommunications system operating protocols, including radio system parameters and call processing procedures. However, those who are of ordinary skill in the art realize that communication system 500 may operate in accordance with any wireless telecommunication system employing a frequency division multiplexing scheme or a time and frequency division multiplexing scheme, wherein a sub-band comprises a frequency sub-band or a time and frequency sub-band, such as a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, 802.16, or 802.21 standards, or any of multiple proposed ultrawideband (UWB) communication systems. Communication system 600 further implements a frequency reuse factor of one, wherein each sector of the multiple sectors 602, 604 utilizes a same frequency bandwidth.

Figure 7A:
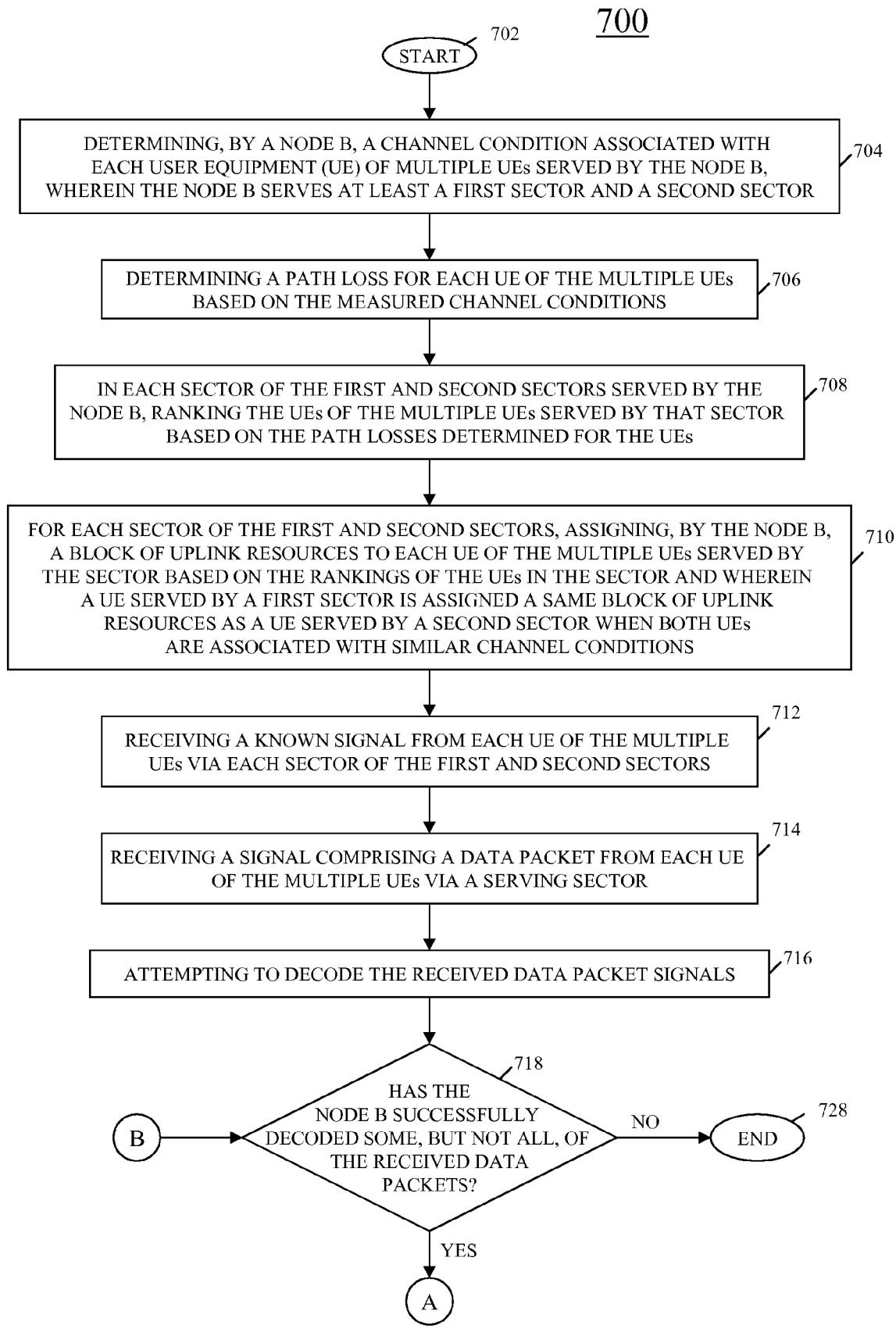
FIG. 7A is a logic flow diagram of a method of intra-site interference management executed by the communication system of FIG. 6 in accordance with another embodiment of the present invention.
Figure 7B:
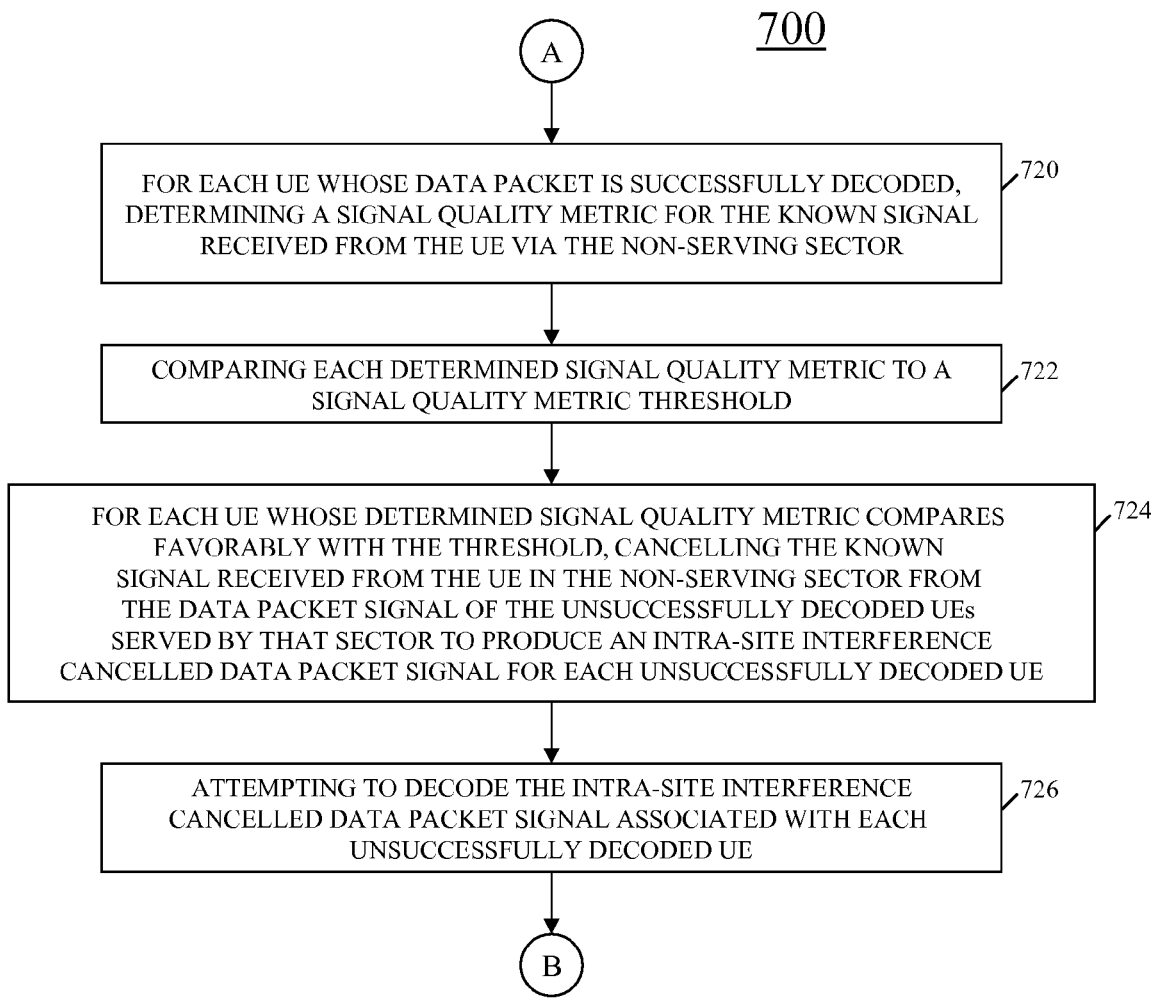
FIG. 7B is a continuation of the logic flow diagram of FIG. 7A illustrating a method of intra-site interference management executed by the communication system of FIG. 6 in accordance with another embodiment of the present invention.

Communication system 600 provides a high rate of frequency reuse by allocating a same resource block in each of sectors 602, 604 to UEs with a similar path loss and/or transmit power and then performing intra-site interference cancellation. Referring now to FIGS. 7A and 7B, a logic flow diagram 700 is provided that illustrates a method of intra-site interference management executed by communication system 600 in accordance with another embodiment of the present invention. Logic flow diagram 700 begins (702) when Node B 610 determines (704) a channel condition in association with each UE serviced by the Node B and active in and served by the sectors serviced by the Node B, that is, UEs 620-622 with respect to sector 602 and UEs 623-625 with respect to sector 604. In one embodiment of the present invention, each UE of the multiple UEs 620-625 may measure a downlink channel condition, preferably measuring Channel Quality Information (CQI) as is known in the art, associated with each sub-band of the multiple sub-bands in a bandwidth employed in the sector wherein the UE resides. Each UE of the multiple UEs 620-625 may then report the measured downlink channel conditions for all of the sub-bands to Node B 610, preferably in a Channel Quality Information (CQI) message. In another embodiment of the present invention, Node B 610 may measure an uplink channel condition for each UE 620-625 based on uplink transmissions received from the UE, such as an uplink pilot signal, an uplink control signal, or an uplink traffic signal. Again, one of ordinary skill in the art realizes that there are many ways for a Node B to determine channel conditions associated with a UE serviced by the Node B, and any such method may be used herein without departing from the spirit and scope of the present invention.

Based on the channel condition measurements, Node B 610 determines (706) a path loss for each UE 620-625. Node B 610 then ranks (708) the multiple UEs served by each sector 602, 604, such as UEs 620-622 with respect to sector 602 and UEs 623-625 with respect to sector 604, based on the path losses determined for the UEs. Node B 610 then assigns (710) a different block of uplink resources, such as a set of one or more sub-bands or an uplink transmit power level, to each UE served by a sector based on the UE's ranking. When a block of uplink resources comprises a set of one or more sub-bands, the sub-bands included in the block of uplink resources need not be contiguous in frequency or time. In assigning the block of uplink resources, Node B 610 assigns a same block of uplink resources to a UE in each sector, such as UE 621 with respect to sector 602 and UE 623 with respect to sector 604, when the UEs, that is, UEs 621 and 623, are associated with similar channel conditions, indicating that the two UEs are experiencing a similar path loss.

For example, and merely for the purpose of illustrating the principles of the present invention and not intended to limit the invention in any way, suppose a first UE 622 in sector 602 experiences a first path loss $PL_1$, a second UE 621 sector 602 experiences a second path loss $PL_2$, and a third UE 620 sector 602 experiences a third path loss $PL_3$, where $PL_1 > PL_2 > PL_3$. Node B 610 ranks UEs 620-622 based on these path losses and accordingly allocates a first block of uplink resources comprising a first set of sub-bands to UE 622, a second block of uplink resources comprising a second set of sub-bands to UE 621, and a third block of uplink resources comprising a third set of sub-bands to UE 620, wherein the first block of uplink resources comprises more sub-bands than the second block of uplink resources and the second block of uplink resources comprises more sub-bands than the third block of uplink resources.

Further, suppose a fourth UE 623 in sector 604 experiences a fourth path loss $PL_4$, a fifth UE 624 in sector 604 experiences a fifth path loss $PL_5$, and a sixth UE 625 in sector 604 experiences a sixth path loss $PL_6$, where $PL_4 > PL_5 > PL_6$. Node B 610 ranks UEs 623-625 based on these path losses and allocates a fourth block of uplink resources to UE 623, wherein the fourth block of uplink resources comprises the same set of sub-bands as the first block of uplink resources. Node B 610 further allocates a fifth block of uplink resources comprising a fifth set of sub-bands to UE 624, wherein the fifth block of uplink resources comprises the same set of sub-bands as the second block of uplink resources, and Node B 610 allocates a sixth block of uplink resources comprising a sixth set of sub-bands to UE 625, wherein the wherein the sixth block of uplink resources comprises the same set of sub-bands as the third block of uplink resources. Thus a same set of sub-bands is allocated to UE 622 in sector 602 and to UE 623 in sector 604, a same set of sub-bands is allocated to UE 621 in sector 602 and to UE 624 in sector 604, and a same set of sub-bands is allocated to UE 620 in sector 602 and to UE 625 in sector 604. By assigning a same block of uplink resources to UEs in each sector experiencing similar channel conditions, communication system 600 reduces the likelihood that a UE utilizing a block of uplink resources in one sector will interfere with a UE utilizing the same block of uplink resources in another sector.

Node B 610 receives (712) a known reference signal, that is, known to both the transmitting device and the receiving device prior to transmission such as a pilot signal, from each UE 620-625 via both the UE's serving sector, that is, sector 602 with respect to UEs 620-622 and sector 604 with respect to UEs 623-625, and the non-serving sector, that is, sector 604 with respect to UEs 620-622 and sector 602 with respect to UEs 623-625. Node B 610 further receives (714) a signal comprising a data packet from each UE 620-625. Node B 610 then attempts to decode (716) the data packets received from UEs 620-625 and determines (718) whether it is able to successfully decode the data packet received from each UE. If Node B 610 successfully decodes (718) the data packets received from all of the UEs 620-625, then logic flow 700 ends (728). If Node B 610 is unable to successfully decode (718) any data packets received from UEs 620-625, that is, when none of the received data packets successfully decodes, then logic flow 700 ends (728). If Node B 610 is able to successfully decode (718) one or more data packets received from UEs 620-625 but less than all of the data packets received from the UEs, then logic flow 700 proceeds to step 720.

At step 720, for each UE whose data packet was successfully decoded by Node B 610, the Node B determines a signal quality metric, such as a signal-to-interference ratio (SIR), a bit error rate (BER), a frame error rate (FER), or any signal quality metric that may occur to one of ordinary skill in the art, for the known signal received from the UE via a non-serving sector, again sector 604 with respect to UEs 620-622 and sector 602 with respect to UEs 623-625. Node B then compares (722) the non-serving sector signal quality metric determined for each successfully decoded UE to a corresponding signal quality metric threshold. When the signal quality metric compares favorably to the signal quality metric threshold, such as exceeds an SIR threshold or is less than a BER or FER threshold, then Node B 610 cancels (724) the known signal received from the UE via the non-serving sector from the data packet signals received from the unsuccessfully decoded UEs served by that sector to produce an intra-site interference cancelled data packet signal for each such UE. Node B then attempts (726) to decode the intra-site interference cancelled data packet signals of the UEs of that sector that have not yet been successfully decoded. Logic flow diagram 700 then returns to step 718.

For example, suppose Node B 610 successfully decodes data packets received from each of UEs 621, 623, and 625, and fails to successfully decode data packets received from UEs 620, 622, and 624. Node B then determines a signal quality metric for a known signal, preferably a pilot signal, received from UE 621 via non-serving sector 604, and further determines a signal quality metric for a known signal, preferably a pilot signal, received from each of UE 623 and 625 via non-serving sector 602. When the signal quality metric determined with respect to UE 621 compares favorably to a corresponding signal quality metric threshold, then Node B 610 cancels the known signal received from UE 621 via non-serving sector 604 from the signals received from the unsuccessfully decoded signal of UE 624 received via sector 604 and re-attempts to decode the data packet of UE 624 that was not successfully decoded. Similarly, when the signal quality metrics determined with respect to each of UE 623 and 625 compares favorably to a corresponding signal quality metric threshold, then Node B 610 cancels the known signals received from each of UE 623 and 625 via sector 602 from the unsuccessfully decoded signals of UEs 620 and 622 received via sector 602 and re-attempts to decode the data packets of UEs 620 and 622 that have not yet been successfully decoded.

Thus by providing for intra-site interference cancellation, a communication system is able to mitigate the impact on one sector of a power allocation scheme employed in another sector. In addition, in order to optimize frequency re-use and to provide an optimal balance of cell-edge performance and spectral efficiency, a communication system determines an adaptive power control parameter based on system performance metrics determined by a serving Node B and further determined by, and reported to the serving Node B by, neighboring Node B's. The adaptive power control parameter is then used to determine an uplink transmit power of a UE served by the serving Node B.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms 'including' and/or 'having', as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by " . . . a" does not, without more constraints, preclude the existence of additional identical elements in the process, method, article, or apparatus that the element.

What is claimed is:

1. A method for uplink power control by a Node B in a Frequency Division Multiple Access communication system comprising:

measuring, by the Node B, a system performance metric;

receiving, by the Node B from each Node B of one or more other Node Bs, a system performance metric measurement;

determining, by the Node B, an adaptive power control parameter based on the system performance metric measured by the Node B and the system performance metrics received from the other Node Bs of the one or more other Node Bs; and receiving, by the Node B, uplink transmissions from one or more users equipment at power levels that are set based on the adaptive power control parameter.

2. The method of claim 1, wherein the system performance metric comprises one or more of an interference level, a number of users equipment in serving cell, a fairness criterion, a cell edge user throughput, and a sector throughput.

3. The method of claim 1, wherein receiving, by the Node B from each Node B of one or more other Node Bs, system performance metric measurement comprises receiving a broadcast of the system performance metric measurement from each Node B of one or more other Node Bs.

4. The method of claim 3, wherein receiving, by the Node B from each Node B of one or more other Node Bs, a system performance metric measurement comprises receiving a broadcast of the system performance metric measurement from each Node B of one or more other Node Bs via a backhaul.

5. The method of claim 1, further comprising broadcasting the adaptive power control parameter to the one or more users equipment served by the Node B.

6. The method of claim 1, further comprising determining an uplink transmit power level for each user equipment of the one or more users equipment based on the adaptive power control parameters.

7. The method of claim 6, further comprising conveying the uplink transmit power level determined for each user equipment to the corresponding user equipment.

8. The method of claim 6, further comprising determining a path loss for each user equipment of the one or more users equipment from the serving Node B and wherein determining an uplink transmit power level for each user equipment comprises determining an uplink transmit power level for each user equipment of one or more users equipment based on the adaptive power control parameter and the path loss determined for the user equipment.

9. The method of claim 8, wherein the one or more users equipment comprises a plurality of users equipment, wherein the method further comprises determining a fractional path loss for each user equipment from the serving Node B of the one or more users equipment based on the path losses determined for all of the plurality of user equipment, and wherein determining an uplink transmit power level for each user equipment comprises determining an uplink transmit power level for each user equipment of the one or more users equipment based on the adaptive power control parameter and the fractional path loss determined for the user equipment.

10. The method of claim 6, wherein determining an uplink transmit power level for each user equipment of the one or more users equipment comprises determining, by the Node B, an uplink transmit power level for each user equipment of the one or more users equipment.

11. The method of claim 6, wherein determining an uplink transmit power level for each user equipment of the one or more users equipment comprises self-determining, by each user equipment of the one or more users equipment, an uplink transmit power level.

12. The method of claim 1, wherein the adaptive power control parameter is determined based on the equation $\alpha(n) = \alpha(n-1) - \text{sgn}\{I_t - \Sigma c_{cell} I_{cell}\} \cdot \Delta$, wherein $\alpha(n)$ represents the adaptive power control parameter, '$\Delta$' represents a power adjustment step size, $I_t$ represents a target system performance metric, $I_{cell}$ represents a measured system performance metric, $c_{cell}$ represents a weighting factor, $\Sigma$ corresponds to a summing of $c_{cell} I_{cell}$ over all of the Node Bs, and $\alpha(n-1)$ represents a determination of $\alpha$ from a preceding uplink power level update period.

13. The method of claim 1, further comprising determining, for each of one or more users equipment served by the Node B and based on the adaptive power control parameter and a fractional path loss associated with the user equipment, a fractional power control parameter corresponding to a fraction of the user equipment's maximum transmit power level that the user equipment is assigned to transmissions on an uplink and wherein receiving, by the Node B, uplink transmissions from one or more users equipment at power levels that are set based on the adaptive power control parameter comprises receiving, by the Node B, uplink transmissions from each of the one or more users equipment at power levels that are set based on the fractional power control parameter determined for the user equipment.

14. A method for uplink power allocation by a user equipment in a Frequency Division Multiple Access communication system comprising:

receiving, from a Node B, an adaptive power control parameter, wherein the adaptive power control parameter is a function of system performance metrics determined by each Node B of a plurality of Node Bs;

determining, based on the adaptive power control parameter and a fractional path loss associated with the user equipment, a fractional power control parameter corresponding to a fraction of the user equipment's maximum transmit power level that the user equipment is assigned to transmissions on an uplink; and transmitting an uplink signal at an uplink transmit power level that is based on the fractional power control parameter.

15. A Node B capable of operating in a Frequency Division Multiple Access communication system and comprising:

an interface that is configured to receive a system performance metric from each Node B of one or more other Node Bs;

a processor that is configured to measure a system performance metric, determine an adaptive power control parameter based on the system performance metric measured by the Node B and the system performance metric measurements received from the other Node Bs of the one or more other Node; and wherein the Node B is configured to receive uplink transmissions from one or more users equipment at power levels that are set based on the adaptive power control parameter.

16. The Node B of claim 15, wherein the system performance metric comprises one or more of an interference level, a number of users equipment in serving cell, a fairness criterion, a cell edge user throughput, and a sector throughput.

17. The Node B of claim 15, wherein the processor is configured to receive a system performance metric measurement by receiving a broadcast of the system performance metric measurement from each Node B of one or more other Node Bs.

18. The Node B of claim 17, wherein the processor is configured to receive a system performance metrics measurement by receiving a broadcast of the system performance metric measurement from each Node B of one or more other Node Bs via a backhaul.

19. The Node B of claim 15, wherein the processor is further configured to broadcast the adaptive power control parameter to the one or more users equipment served by the Node B.

20. The Node B of claim 15, wherein the processor is further configured to determine an uplink transmit power level for each user equipment of the one or more users equipment based on the adaptive power control parameter.

21. The Node B of claim 20, further comprising conveying the uplink transmit power level determined for each user equipment to the corresponding user equipment.

22. The Node B of claim 20, wherein the processor is further configured to determine a path loss for each user equipment of the one or more users equipment and wherein the processor is configured to determine an uplink transmit power level for each user equipment by determining an uplink transmit power level for each user equipment of one or more users equipment based on the adaptive power control parameter and the path loss determined for the user equipment.

23. The Node B of claim 22, wherein the one or more users equipment comprises a plurality of users equipment, wherein the processor is further configured to determine a fractional path loss for each user equipment of the one or more users equipment based on the path losses determined for all of the plurality of user equipment, and wherein the processor is configured to determine an uplink transmit power level for each user equipment by determining an uplink transmit power level for each user equipment of the one or more users equipment based on the adaptive power control parameter and the fractional path loss determined for the user equipment.

24. The Node B of claim 20, wherein the processor is configured to determine an uplink transmit power level for each user equipment of the one or more users equipment by determining an uplink transmit power level for each user equipment of the one or more users equipment.

25. The Node B of claim 15, further comprising an at least one memory device that maintains an equation $\alpha(n)=\alpha(n-1)-\text{sgn}\{I_t-\Sigma c_{cell}I_{cell}\}\cdot\Delta$, wherein $\alpha(n)$ represents the adaptive power control parameter, '$\Delta$' represents a power adjustment step size, $I_t$ represents a target system performance metric, $I_{cell}$ represents a measured system performance metric, $c_{cell}$ represents a weighting factor, $\Sigma$ corresponds to a summing of $c_{cell}I_{cell}$ over all of the Node Bs, and $\alpha(n-1)$ represents a determination of $\alpha$ from a preceding uplink power level update period, and wherein the processor is configured to determine the adaptive power control parameter based on the equation.

26. A system comprising the Node B of claim 15, wherein the processor of the Node B is configured to convey the adaptive power control parameter to the one or more user equipment and further comprising a user equipment that is configured to receive the adaptive power control parameter, determine, based on the adaptive power control parameter and a fractional path loss associated with the user equipment, a fractional power control parameter corresponding to a fraction of the user equipment's maximum transmit power level that the user equipment is assigned to transmissions on an uplink, and transmit an uplink signal at a power level that is based on the fractional power control parameter.

27. A user equipment capable of operating in a Frequency Division Multiple Access communication system and comprising a processor that is configured to receive an adaptive power control parameter from a Node B, wherein the adaptive power control parameter is a function of system performance metrics determined by each Node B of a plurality of Node Bs, determine, based on the adaptive power control parameter and a fractional path loss associated with the user equipment, a fractional power control parameter corresponding to a fraction of the user equipment's maximum transmit power level that the user equipment is assigned to transmissions on an uplink, and transmit an uplink signal at a power level that is based on the fractional power control parameter.

28. The user equipment of claim 27, further comprising an at least one memory device that maintains an equation $\alpha(n)=\alpha(n-1)-\text{sgn}\{I_t-\Sigma c_{cell}I_{cell}\}\cdot\Delta$, wherein $\alpha(n)$ represents the adaptive power control parameter, '$\Delta$' represents a power adjustment step size, $I_t$ represents a target system performance metric, $I_{cell}$ represents a measured system performance metric, $c_{cell}$ represents a weighting factor, $\Sigma$ corresponds to a summing of $c_{cell}I_{cell}$ over all of the Node Bs, and $\alpha(n-1)$ represents a determination of $\alpha$ from a preceding uplink power level update period, and wherein the processor is configured to determine the adaptive power control parameter based on the equation.

* * * * *